United States Patent
Harrison

(10) Patent No.: US 12,006,558 B2
(45) Date of Patent: Jun. 11, 2024

(54) NICKEL-BASED ALLOY POWDER

(71) Applicant: LPW TECHNOLOGY LTD, Widnes (GB)

(72) Inventor: Neil Harrison, Widnes (GB)

(73) Assignee: LPW TECHNOLOGY LTD, Widnes (GB)

( * ) Notice: Subject to any disclaimer, the term of this patent is extended or adjusted under 35 U.S.C. 154(b) by 44 days.

(21) Appl. No.: 17/264,891

(22) PCT Filed: Aug. 2, 2019

(86) PCT No.: PCT/GB2019/052170
§ 371 (c)(1),
(2) Date: Feb. 1, 2021

(87) PCT Pub. No.: WO2020/025968
PCT Pub. Date: Feb. 6, 2020

(65) Prior Publication Data
US 2021/0301372 A1    Sep. 30, 2021

(30) Foreign Application Priority Data
Aug. 2, 2018    (GB) .................................... 1812611

(51) Int. Cl.
C22C 19/05        (2006.01)
B22F 9/08         (2006.01)
(Continued)

(52) U.S. Cl.
CPC ............ *C22C 19/056* (2013.01); *B22F 9/082* (2013.01); *B22F 9/10* (2013.01); *B22F 10/28* (2021.01); *B33Y 10/00* (2014.12); *B33Y 70/00* (2014.12); *C22C 1/0433* (2013.01); *C22C 1/1042* (2013.01); *C22C 19/007* (2013.01); *B22F 1/142* (2022.01); *B22F 2301/052* (2013.01); *B22F 2301/15* (2013.01); *B22F 2301/205* (2013.01); *B22F 2999/00* (2013.01)

(58) Field of Classification Search
USPC .......... 420/441–460; 148/410, 411, 426–429
See application file for complete search history.

(56) References Cited

U.S. PATENT DOCUMENTS 3,902,862 A * 9/1975 Moll ...................... C22C 1/0433
                                                        419/48
5,649,280 A * 7/1997 Blankenship ............. C22F 1/10
                                                        419/25
(Continued)

FOREIGN PATENT DOCUMENTS

EP    2065479 A2    6/2009
EP    2256222 A1    12/2010
(Continued)

OTHER PUBLICATIONS

International Search Report and Written Opinion for corresponding PCT application No. PCT/GB2019/052170, mailed Nov. 13, 2019.

*Primary Examiner* — George Wyszomierski
(74) *Attorney, Agent, or Firm* — Notaro, Michalos & Zaccaria P.C.

(57) ABSTRACT

A nickel-based alloy powder for additive manufacturing having in weight %: C:0.09 to 0.17, Ti:3.8 to 4.5, Zr:>0.06, W:1.8 to 2.6, and Al:3.0 to 3.8 is disclosed.

17 Claims, 1 Drawing Sheet

(51) Int. Cl.
*B22F 9/10* (2006.01)
*B22F 10/28* (2021.01)
*B33Y 10/00* (2015.01)
*B33Y 70/00* (2020.01)
*C22C 1/04* (2023.01)
*C22C 1/10* (2023.01)
*C22C 19/00* (2006.01)
*B22F 1/142* (2022.01)

(56) References Cited

U.S. PATENT DOCUMENTS

2005/0069450 A1* 3/2005 Jiang .................... C22C 19/058
 420/446
2007/0141374 A1* 6/2007 Mourer .................. C22C 19/03
 427/337
2010/0303665 A1* 12/2010 Bain .................... C22C 1/0433
 420/588

FOREIGN PATENT DOCUMENTS

| EP | 2065479 A3 | 11/2012 |
| EP | 3257956 A1 | 12/2017 |
| FR | 1083251 A | 1/1955 |
| GB | 972212 A | 10/1964 |
| GB | 1511999 A | 5/1978 |
| GB | 1544720 A | 4/1979 |

* cited by examiner

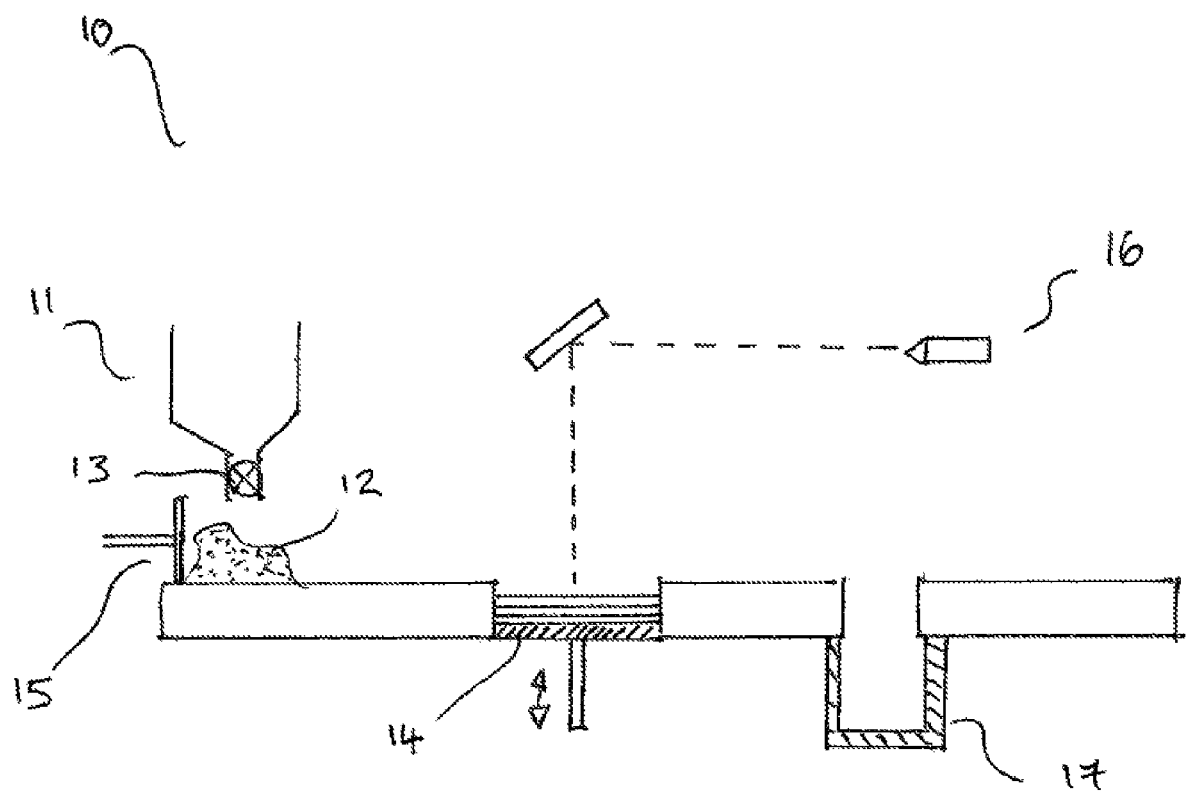

NICKEL-BASED ALLOY POWDER

TECHNICAL FIELD OF THE INVENTION

The present invention relates to a nickel-based alloy powder for additive manufacturing, to a method of producing the nickel-based alloy powder, to a component formed from the nickel-based alloy powder, to a method of producing said component and to the use of the nickel-based alloy powder in an additive manufacturing process.

BACKGROUND TO THE INVENTION

Additive manufacturing (AM) is a process in which components are produced from a powdered material such as a metal or a metal alloy. The process typically involves depositing a layer of powder on a build platform and then selectively fusing the powder with a laser or electron beam to form a first component layer. A further layer of powder is then deposited onto the first component layer and said further powder layer is selectively fused to form a second component layer. This process is repeated so that components are formed layer by layer. In recent years there has been an increasing trend to produce components by additive manufacturing (AM) rather than by conventional casting processes since AM allows a greater variety of complex components to be produced in less time.

Nickel-based superalloys such as Inconel 738 possess exceptional high-temperature strength and oxidation resistance, making them very suitable for use in the production of component parts that are to be used in high temperature environments, e.g., gas turbine engine components for aerospace applications. However, nickel based alloys such as Inconel 738 alloys are known to be susceptible to cracking and one approach to minimise solidification cracking in cast nickel-based alloys is to ensure that the zirconium content is kept as low as possible. For this reason, it is generally understood that for additive manufacturing operations, the zirconium content should be less than 0.06 wt % in order to minimise the material's susceptibility to hot cracking. Despite this, and even when the zirconium content is limited to less than 0.06 wt %, the issue of hot cracking remains and therefore there is a need to provide an adjusted composition that avoids or further reduces an alloy's susceptibility to hot cracking.

It is an object of embodiments of the present invention to provide a nickel-based alloy with reduced susceptibility to hot cracking in additive manufacturing applications.

It is another object of embodiments of the present invention to provide a nickel-based alloy with reduced susceptibility to hot cracking in additive manufacturing applications and improved rupture strength.

SUMMARY OF THE INVENTION

According to a first aspect of the invention there is provided a nickel-based alloy powder for additive manufacturing comprising in weight %:

| C: | 0.09 to 0.17, |
| --- | --- |
| Ti | 3.8 to 4.5, |
| Zr: | >0.06. |

Zirconium is typically added to improve rupture strength of nickel-based alloys, and as discussed above, it is generally understood not to exceed a zirconium content of 0.06 wt % in conventional casting and in additive manufacturing applications. However, in contradiction to current industry beliefs, the inventors have found that alloy compositions having a zirconium content greater than 0.06 wt % exhibit reduced susceptibility to hot cracking in additive manufacturing. Zirconium also contributes to solid solution strengthening, even in low wt % values, and therefore contributes to cold cracking resistance.

The nickel based alloy powder may comprise in wt %:

| C: | 0.09 to 0.17 |
| --- | --- |
| Ti: | 3.8 to 4.5, |
| W: | 1.8 to 2.6 |
| Zr: | >0.06 |

In some embodiments the nickel based alloy powder may comprise in wt %:

| Cr: | 15.7 to 17.0, |
| --- | --- |
| Co: | 3.0 to 9.0, |
| Ti: | 3.8 to 4.5, |
| Al: | 3.0 to 3.8, |
| W: | 1.8 to 2.6, |
| Ta: | 1.5 to 2.5, |
| Mo: | 1.0 to 2.5, |
| Nb: | 0.7 to 1.2, |
| C: | 0.09 to 0.17, |
| Zr: | >0.06, |
| B: | 0.008 to 0.012, |

In some embodiments the composition may comprise 0.07 to 0.15 wt % Zr. The inventors have found that a reduction in hot crack susceptibility could be obtained when the composition has a zirconium content of 0.07 wt % and that a significant increase in hot crack susceptibility is observed when the zirconium content is greater than 0.15 wt %.

The composition may comprise 0.08 to 0.12 wt % zirconium since this range represents a window in which optimally low hot crack susceptibility is achieved. Moreover, within this range, a good balance between reduced hot crack susceptibility and cold cracking resistance can be obtained. In some embodiments the composition may comprise >0.08 wt % zirconium. For example, the zirconium content could range from 0.09 wt % to 0.11 wt %.

Chromium is typically added to nickel-based superalloys to provide oxidation and sulfidation resistance. It also combines with carbon to form chromium carbides which provides grain boundary strengthening and solid solution strengthening of the primary γ matrix. In order provide sufficient oxidation resistance, sulfidation resistance and strengthening through carbide and solid solution strengthening, the chromium content should be from 15.7 to 17.0 wt %. In some embodiments the composition may comprise 16.0 to 17.0 wt % chromium. In other embodiments the chromium content may be from 16.0 to 16.5 wt %. When the content of chromium is greater than 17.0 wt % the inventors found that chromium substitutes for other key alloying elements which can result in the excess formation of the chromium carbides and as a consequence reduced ductility.

Cobalt is primarily used in nickel superalloys to increase the solvus temperature of the γ' strengthening phase, thereby increasing the effective operating temperature of the alloy. Cobalt also increases the sulfidation resistance of the alloy and provides solid solution strengthening in the primary γ matrix. In order to effectively raise the γ' solvus temperature and provide sufficient sulfidation resistance the cobalt content is preferably in a range from 8.0 wt % to 9.0 wt %. The inventors have found that cobalt may substitute for other key alloying elements if the cobalt content exceeds 9.0 wt %. This in turn could lead to a reduction in the mechanical properties of the resulting superalloy powder as well as increasing costs.

Aluminium and titanium are known to combine with nickel to form Ni3(Al, Ti) γ' phases, the precipitation of which provides necessary high temperature strengthening to nickel-based superalloys. It has been found that when the content of aluminum and titanium is less than 3.0 wt % and 3.8 wt % respectively that the volume fraction of γ' phase does not provide sufficient high temperature strengthening. Moreover, the susceptibility of hot cracking of the nick-based alloy during laser additive manufacturing has been found to increase when the aluminum content is above 3.8 wt % and the titanium content is greater than 4.5 wt % titanium.

The composition may comprise 3.9 wt % to 4.5 wt % titanium. In some embodiments the composition may comprise 3.9 wt % to 4.3 wt % titanium. In a preferred embodiment the composition may comprise 3.9 wt % to 4.1 wt % titanium. The inventors have found that an optimally low hot crack susceptibility and precipitate volume fraction can be obtained when the titanium content is in the range of 3.9 to 4.1 wt %.

The composition may comprise 3.2 to 3.6 wt % aluminium. The inventors have found that an optimally low hot crack susceptibility and precipitate volume fraction is achieved when the aluminium content is in the range of 3.2 to 3.6 wt %.

Tungsten provides solid solution strengthening and carbide strengthening. When the tungsten content is less than 1.8 wt % there is insufficient tungsten for it to form effective volumes of carbides. There is also insufficient tungsten for it to provide a sufficient contribution to solid solution strength and therefore reduce cold crack susceptibility. The inventors have also found that the susceptibility to hot cracking increases at concentrations greater than 2.6 wt %. The tungsten content may be 2.0 to 2.4 wt % since this maximises the solid solution strengthening contribution, whilst maintaining a minimal hot crack susceptibility. In some embodiments, the composition may comprise 2.1 to 2.3 wt % tungsten.

Tantalum provides solid solution strengthening, precipitation strengthening and carbide strengthening. The inventors have found that a low content of tantalum reduces the hot crack susceptibility of nickel-based alloys in AM processing. When the tantalum content is below 1.5 wt % there is not sufficient tantalum for it to be effective in reducing hot crack susceptibility, nor form effective volumes of precipitates or carbides, nor provide a sufficient contribution to solid solution strength. On the other hand, when the tantalum content is greater than 2.5 wt % this raises the cost of producing the nickel-based alloy powder. In order to maximise solution contribution and reduce hot crack susceptibility whilst allowing for a more cost effective alloy composition, the tantalum content may be 1.8 to 2.0 wt %.

Molybdenum provides solid solution strengthening and MC carbide strengthening. When the molybdenum content is less than 1 wt % solid solution strengthening contribution is not sufficient to be effective. On the other hand, when the molybdenum content is greater than 2.5 wt % this raises the cost, causes molybdenum to substitute for other key alloying elements and results in excess formation of molybdenum carbides which are known to reduce ductility. The composition may comprise 1.5 to 2.0 wt % molybdenum since this maximises the solid solution strengthening contribution, whilst avoiding the negative impact of excessive molybdenum carbides.

Niobium provides solid solution strengthening, precipitation strengthening and carbide strengthening. When the composition comprises less than 0.7 wt % there is not sufficient niobium to form effective volumes of precipitates or carbides, nor provide a sufficient contribution to solid solution strength. However, if the niobium content exceeds 1.2 wt % then this raises the cost of producing the nickel-based alloy powder, causes niobium to substitute for other key alloying elements and results in the excess formation of niobium nitrides which can reduce ductility. In order to maximise solution contribution and to avoid, or at least minimise the negative impact of excess niobium nitrides, the composition may comprise 0.8 to 1 wt % niobium.

Carbon is useful to increase solution strengthening. Therefore, the composition should comprise at least 0.09 wt % carbon. However, if the carbon content exceeds 0.17 wt % then the ductility of the alloy may reduce which in turn increases the risk of cold cracking. The inventors have found that a good balance between hot crack susceptibility and carbide volume fraction can be obtained when the carbon content is 0.09 to 0.14 wt %. In some embodiments the carbon content may be from 0.10 to 0.13.

Due to powder having a large surface to volume ratio, the content of nitrogen in the powder can reach detrimental levels through the formation of nitrides (typically with Ti, Nb or Zr) at the alloy surface during atomisation. Moreover, the inventors have found that the nitrogen content increases with repeated AM processing. To account for this and the detrimental effects of nitride formation, the nitrogen content in the powder should be <0.03 wt %. In particular, the composition may comprise 0.015 wt % nitrogen since this should enable the powder to be recycled to a greater extent.

Oxygen is known to be a tramp element in nickel-based superalloys which reacts with the surface of the alloy to form a thin oxide layer. As with nitrogen, in powder form the large surface to volume ratio means the overall concentration of oxygen for a volume of powder is significantly higher than for the bulk solid. The inventors have found that when the oxygen content is greater than 0.04 wt %, fatigue life of additively manufactured nickel alloys is significantly reduced. The inventors have also found that the oxygen content of powder increases with repeated AM processing. To account for this, and the effect on fatigue properties, the oxygen content in the composition may be ≤0.04 wt %. In particular, the composition may comprise an oxygen content of ≤0.025 wt % since this should enable the powder to be recycled a greater number of times. For example, the composition may comprise an oxygen content of ≤0.02.

Boron forms metal borides which provide precipitation strengthening and grain boundary strengthening. Therefore, the boron content should be 0.008 wt % or more so that sufficient volumes of boride phases are formed. However, the inventors have found that the hot crack susceptibility of the alloy is increased if the boron content is too high. Therefore, the content of boron in the composition should be 0.012 wt % or less.

In some embodiments the nickel-based alloy powder has the following composition in weight %:

| | |
|---|---|
| Cr: | 16.0 to 17.0, |
| Co: | 8.0 to 9.0, |
| Ti: | 3.9 to 4.1, |

| | |
|---|---|
| Al: | 3.2 to 3.6, |
| W: | 2.0 to 2.4, |
| Ta: | 1.8 to 2.0, |
| Mo: | 1.5 to 2.0, |
| Nb: | 0.8 to 1.0, |
| C: | 0.09 to 0.14, |
| Zr: | 0.07 to 0.15, |
| B: | 0.008 to 0.012, | the reminder being nickel and inevitable impurities.

The composition may comprise one or more of the following elements in weight %: ≤0.0005 Ag, ≤0.00005 Bi, ≤0.1 Cu, ≤0.01 Mg, ≤0.015 P, ≤0.0005 Pb, ≤0.001 Se and ≤0.10 Si.

The nickel-based alloy powder may be an Inconel 738 superalloy. In particular, the nickel-based alloy powder may be a low carbon Inconel 738 superalloy.

According to a second aspect of the invention there is provided a method of producing a nickel-based alloy powder, the method comprising the steps of the atomising a liquid stream of molten metal having the composition according to the first aspect of the invention. The method according to second aspect of the invention may incorporate any or all of the features described in relation to the nickel-based alloy powder composition according to the first aspect of the invention as desired or as appropriate.

The powder may be produced by liquid atomisation, gas atomisation or by centrifugal atomisation. In some embodiments the atomised powder may be annealed in order to reduce the carbon and oxide content in the atomised powder alloy.

According to a third aspect of the invention there is provided a method of producing a three-dimensional component by additive manufacturing which comprises the steps of:
i. providing a layer of the nickel-based alloy powder according to the first aspect of the invention on a build platform;
ii. selectively fusing regions of the powder to form a first component layer;
iii. providing a further layer of powder on the build platform and selectively fusing said further powder layer to form a subsequent component layer, and
iv. repeating step (iii) as required to produce the three-dimensional component.

The method according to the third aspect of the invention may incorporate any or all of the features described in relation to the nickel-based alloy powder according to first aspect of the invention and/or the features described in relation to the method according to the second aspect of the invention as desired or as appropriate.

According to a fourth aspect of the invention there is provided a nickel-based alloy component having the composition according to the first aspect of the invention. The nickel-based alloy component according to the fourth aspect of the invention may incorporate any or all features described in relation to the first aspect of the invention as desired or as appropriate.

According to a fifth aspect of the invention there is provided the use of the powder according to the first aspect of the invention in an additive manufacturing process. As such, the use of the powder according to the fifth aspect of the invention may incorporate any or all features described in relation to the first aspect of the invention and/or in relation to the method according to the third aspect of the invention as desired or required.

DETAILED DESCRIPTION OF THE DRAWING

Embodiments of the present invention are explained in more detail below with reference to FIGURES.

FIG. 1 shows an additive manufacturing apparatus according to the present invention.

DETAILED DESCRIPTION OF THE INVENTION

In order that the invention may be more clearly understood one or more embodiments thereof will now be described, by way of example only.

According to the present invention there is provided an IN-738LC nickel-based superalloy powder (E1) for use in additive manufacturing applications, the composition of which is shown in Table 1 below.

In order to produce a component by additive manufacturing there is provided an additive manufacturing apparatus 10. The AM apparatus 10 comprises at least one container 11 which is configured to hold and dispense the powder 12 according to the present invention. The container 11 is funnel shaped at its lower end and an electronic valve 13, configured to control the flow of powder 12 from the container 11, is provided in the funnel portion of the container. The electronic valve 13 is controlled by a control unit (not shown) which is in communication with both the electronic valve 13 and a personal computer or similar device (not shown).

The container 11 is funnel shaped at its lower end and an electronic valve 13, configured to control the flow of powder 12 from the container 11, is provided in the funnel portion of the container. The electronic valve 13 is controlled by a control unit (not shown) which is in communication with both the electronic valve 13 and a personal computer or similar device (not shown).

The AM machine 10 also comprises a build platform 14 located below the container 11 that is configured to move in the y-direction. Arranged above the build platform 14 is a wiper 15. The wiper 15 is moveable from a first position in which the wiper 15 is held clear of the powder 12 (when present on the build platform) to a second position in which the wiper 15 engages the powder 12. The wiper is also operable for spreading powder 12 across the build platform 14 to form a layer of powder 12 having a substantially uniform thickness. In particular, the wiper 15 is operable to move from one side of the build platform 14 to the other once the wiper 15 has been brought into engagement with the powder 12 on the build platform 13.

The apparatus 10 also comprises a heat source 16 for selectively melting powder particles within a given layer into a pre-determined shape. In this example the heat source 16 is a laser beam, but it will be appreciated that electron beam, microwave or plasma heat sources could alternatively be used. Prior to commencing the additive manufacturing process, a 3D model of the component to be produced is generated using computer aided design (CAD) software on a personal computer or similar device. For example, the component may be a gas turbine engine component.

TABLE 1

| Alloy (wt %) | Cr | Co | Ti | Al | W | Ta | Mo | Nb | C | Zr | B | Ni |
|---|---|---|---|---|---|---|---|---|---|---|---|---|
| C1 | 16.00 | 8.50 | 3.40 | 3.40 | 2.60 | 1.75 | 1.75 | 0.90 | 0.11 | 0.05 | 0.010 | Bal |
| C2 | 15.76 | 8.43 | 3.61 | 3.36 | 1.84 | 2.46 | 1.47 | 0.48 | 0.11 | 0.018 | 0.0089 | Bal |
| C3 | 15.66 | 8.26 | 3.75 | 3.43 | 1.9 | 2.26 | 1.47 | 0.49 | 0.083 | 0.034 | 0.0055 | Bal |
| C4 | 15.88 | 8.30 | 3.31 | 3.51 | 2.62 | 1.90 | 1.75 | 0.90 | 0.10 | 0.02 | 0.011 | Bal |
| C5 | 16.00 | 8.30 | 3.30 | 3.50 | 2.60 | 1.90 | 1.80 | 0.91 | 0.1 | 0.03 | 0.011 | Bal |
| C6 | 12.0 | 0 | 0.60 | 5.5 | 0 | 0 | 5.20 | 2.50 | 0.15 | 0.06 | 0.01 | Bal |
| C7 | 8.23 | 9.25 | 0.81 | 5.63 | 9.42 | 3.26 | 0.51 | 0.09 | 0.08 | 0.011 | 0.018 | Bal |
| C8 | 22.3 | 19.2 | 3.60 | 1.80 | 1.90 | 1.50 | 0.00 | 1.00 | 0.16 | 0.13 | 0.005 | Bal |
| E1 | 16.0 | 8.30 | 3.90 | 3.50 | 2.40 | 1.91 | 1.75 | 0.90 | 0.10 | 0.08 | 0.009 | Bal |
| E2 | 16.39 | 8.68 | 4.04 | 3.66 | 2.17 | 1.5 | 1.53 | 0.71 | 0.11 | 0.11 | 0.0099 | Bal |

The CAD model is then subjected to finite element analysis (FEA) which is a computerised method for predicting how a product reacts under various physical conditions such as stress. The CAD files are then converted into .STL files which can be understood by the additive manufacturing apparatus 10. The 3D model generated by the CAD software is then sliced electronically to obtain a series of 2D layers, which each define a planer cross section through the model of the component. The computer then outputs a signal to the control unit to open the electronic valve 12 of a container 11 so that the powder 12 is dispensed from the container 11. To ensure that the layer of powder 12 has a substantially uniform thickness, the wiper 15 is brought into engagement with the powder 12 and is then moved back and forth so that powder is spread across the build platform 14 until the desired layer thickness is obtained. The wiper 15 is then retracted and held out of contact with the powder 12. In forming the layer of powder 12 it will be appreciated that a proportion of the powder 12 will be wiped from the surface of the build platform 14. This powder is collected in a collection chamber 17 so that this unfused powder 12 can be re-used and reintroduced into the container 11 or into a further container (not shown).

Selected regions of powder 12 corresponding with the desired shape of the component are then irradiated with a laser beam 16 which causes particles in the layer to fuse and form a solid mass on cooling. In this example a 3D energy density of between 60 and 80 J/mm$^{-3}$ was used, although it will be appreciated that the value of each parameter (laser power (W), scan velocity (mm/s), hatch distance (μm) and layer thickness (μm) can be varied. For example, when additively manufacturing nickel-based super alloys, a scan velocity of 600-1200 mm/s and hatch distances between 50 and 115 μm are typically used.

The build platform 14 is then lowered and another layer of powder is dispensed from the container 11 and the above described process of forming a layer with uniform layer thickness and irradiating selected regions with a laser beam 16 is repeated until the component is formed.

The components were then analysed to determine their crack susceptibility by measuring crack density. Crack density was determined by counts per unit area. Using an area of 0.25 mm$^2$ (500×500 μm) square, 20 measurements were taken from each sample, enabling a statistically safe determination of an average per mm$^2$ with 95% confidence level error. The 20 measurements were split across multiple micrographs depending on how many were taken per sample; for the case of a 5×5×5 mm cube this would be 5 measurements per micrograph, 4 micrographs per sample. In addition, micrographs were taken across specific regions of the sample (central, edge, top corner and bottom corner) in order to remove local bias. A crack severity scale is given below in Table 2:

TABLE 2

| | Crack severity scale | | | | |
|---|---|---|---|---|---|
| | 1 | 2 | 3 | 4 | 5 |
| Cracks per mm$^2$ | 0 | 1-5 | 6-10 | 11-20 | 21+ |

A crack severity rating (CSR) of 1 (cracks) is considered to be acceptable. However, a crack severity rating of 2 to 5 is considered unacceptable for most applications.

TABLE 3

| Example | C1 | C2 | C3 | C4 | C5 | C6 | C7 | C8 | E1 | E2 |
|---|---|---|---|---|---|---|---|---|---|---|
| CSR | 4 | 4 | 3 | 4 | 4 | 5 | 5 | 4 | 1 | 1 |

The inventors found that components produced from the composition according to the invention (E1) and E2 exhibited reduced hot crack susceptibility relative to a commercially available nickel-based superalloy (C1) having a zirconium content of 0.05 wt %. Thus, contrary to current industry beliefs, it has been found that increasing the content of zirconium to above 0.06 wt % reduces the alloy's susceptibility to hot cracking in additive manufacturing processing. Moreover, improvements in rupture strength were observed which has been attributed to the E1 alloy composition containing an increased content of zirconium relative to the C1 alloy.

The C2 alloy received a crack severity rating of 4. The high number of cracks observed for this alloy has been attributed to it having a zirconium content of 0.06 wt % or less and a titanium content below 3.8 wt % which means there is insufficient high temperature strengthening during additive manufacturing. Similar results were obtained for the C4 and C5 alloys which also contained less than 3.8 wt % titanium and 0.06 wt % or less zirconium.

The C3 alloy received a crack severity rating of 3. Despite this alloy having a low carbon content (0.083 wt %) which would decrease solution strengthening, the reduced number of cracks relative to the C2, C4 and C5 alloys is believed to be due to the C3 alloy containing a higher content of titanium (3.75 wt %) and zirconium (0.034 wt %).

The C6 and C7 alloys both received a crack severity rating of 5. This is due to these alloys containing 0.06 wt % or less of zirconium, less than 3.8 wt % of titanium and more than 3.8 wt % of aluminium. As discussed above, a titanium content of less than 3.8 wt % results in reduced high temperature strengthening, whereas an aluminum content above 3.8 wt % increases the alloy's susceptibility to hot cracking during additive manufacturing. Moreover, the absence of tungsten in the C6 alloy means that there is no tungsten for forming carbides or for contributing to solid solution strength and therefore such alloys exhibit an increased cold crack susceptibility. In the case of the C7 alloy which contains a significant amount of tungsten (9.42 wt %) it is also believed that the high tungsten content contributes to increasing the hot crack susceptibility of the alloy.

Despite the C8 alloy having a zirconium content above 0.06 wt %, it was found to be very susceptible to hot cracking and received a crack severity rating of 4 (11-20 cracks). This increased hot crack susceptibility has been attributed to the C8 alloy having a titanium content below 3.8 wt % and a low aluminium content (1.8 wt %).

The above embodiment is described by way of example only. Many variations are possible without departing from the scope of the invention.

The invention claimed is:

1. A nickel-based alloy powder for additive manufacturing consisting in weight %:

| | |
|---|---|
| Cr: | 15.7 to 17.0, |
| Co: | 3.0 to 9.0, |
| Ti: | 3.8 to 4.5, |
| Al: | 3.0 to 3.8, |
| W: | 1.8 to 2.6, |
| Ta: | 1.5 to 2.5, |
| Mo: | 1.0 to 2.5, |
| Nb: | 0.7 to 1.2, |
| C: | 0.09 to 0.17, |
| Zr: | >0.06 to 0.15, |
| B: | 0.008 to 0.012, | the remainder being nickel and inevitable impurities.

2. The nickel-based alloy powder according to claim 1, wherein the composition comprises 0.07 to 0.15 Zr.

3. The nickel-based alloy powder according to claim 1, wherein the composition comprises >0.08 to 0.12 Zr.

4. The nickel-based alloy powder according to claim 1, wherein the powder comprises 3.9 to 4.3 Ti.

5. The nickel-based alloy powder according to claim 1, wherein the powder comprises 3.2 to 3.6 Al.

6. The nickel-based alloy powder according to claim 1, wherein the powder comprises 2.0 to 2.4 W.

7. The nickel-based alloy powder according to claim 1, wherein the powder comprises 1.8 to 2.0 Ta.

8. The nickel-based alloy powder according to claim 1, wherein the powder comprises 1.5 to 2.0 Mo.

9. The nickel-based alloy powder according to claim 1, wherein the powder comprises 0.8 to 1.0 Nb.

10. The nickel-based alloy powder according to claim 1, wherein the powder comprises 0.09 to 0.14 C.

11. A nickel-based alloy component having the composition according to claim 1.

12. A method of producing a nickel-based alloy powder, the method comprising the step of atomizing a liquid stream of molten metal having a composition according to claim 1 to form an atomized powder.

13. The method according to claim 12, wherein the atomizing comprises liquid atomisation, gas atomisation or centrifugal atomisation.

14. The method according to claim 12 further comprising annealing the atomized powder.

15. The method of producing a three-dimensional component by additive manufacturing which comprises the steps of:
  i. providing a layer of the nickel-based alloy powder according to claim 1 on a build platform;
  ii. selectively fusing regions of the powder to form a first component layer;
  iii. providing a further layer of the powder on the build platform and selectively fusing said further powder layer to form a subsequent component layer, and
  iv. repeating step (iii) as required to produce the three-dimensional component.

16. A method of using the powder according to claim 1 comprising the step of employing the powder in an additive manufacturing process.

17. A nickel-based alloy powder for additive manufacturing, wherein the powder consists in weight %:

| | |
|---|---|
| Cr: | 16.0 to 17.0, |
| Co: | 8.0 to 9.0, |
| Ti: | 3.9 to 4.3, |
| Al: | 3.2 to 3.6, |
| W: | 2.0 to 2.4, |
| Ta: | 1.8 to 2.0, |
| Mo: | 1.5 to 2.0, |
| Nb: | 0.8 to 1.0, |
| C: | 0.09 to 0.14, |
| Zr: | 0.07 to 0.15. |
| B: | 0.008 to 0.012, |
| O: | ≤0.04. |
| N: | ≤0.03. | the remainder being nickel and inevitable impurities.

* * * * *